UNITED STATES PATENT OFFICE.

EMMANUEL HANCOCK AND DANIEL DAVID, OF CARDIFF, ENGLAND.

PLATE FOR ELECTRICAL OR SECONDARY BATTERIES OR ACCUMULATORS.

1,133,641.

Specification of Letters Patent.

Patented Mar. 30, 1915.

No Drawing.   Application filed August 25, 1914.   Serial No. 858,536.

*To all whom it may concern:*

Be it known that we, EMMANUEL HANCOCK and DANIEL DAVID, subjects of the King of Great Britain and Ireland, residing at 26 Penhill road, Canton, Cardiff, Glamorgan, England, and 1ª Keppoch street, Cardiff aforesaid, respectively, have invented certain new and useful Improvements in Plates for Electrical or Secondary Batteries or Accumlators, of which the following is a specification.

This invention relates to plates or active elements for electrical accumulators or secondary batteries and has for its object to provide an active element of good conductivity and high capacity, also to provide a self supporting plate or element not liable to warp, capable of being charged or discharged at any rate without deterioration or even short circuited without injury and that shall be superior in conductivity and capacity as compared with the plates at present in use.

Our invention consists in mixing into a paste oxids of lead, sulfuric acid and a vegetable substance or substance rich in carbohydrates or free carbon and subjecting the mixture to a high temperature without access of air.

In the manufacture of accumulator plates in accordance with the invention we find that good results are obtained by treating the ingredients as hereinafter described and in the following proportions but it will of course be understood that the proportions given and the method of treatment may be varied without departing from our invention: One part by weight of potatoes partly boiled is mixed with enough sulfuric acid of specific gravity 1.200 to make a thin paste to which five parts of litharge and sufficient sulfuric acid to maintain the mixture of a pasty consistency are added gradually. The mass is then molded into plates which are thoroughly dried while inclosed in a cast iron box from which air is excluded wood charcoal being filled in around and between the plates. After inclosing the plates in the manner described they are subjected for from eight to ten hours to a temperature rising gradually to about 950° F. in the first four hours and maintained to the end of the heating period. At the end of the heating period the plates are left in the box until quite cold when they are removed and after brushing the carbon off the sides of the plates they are ground to a fine powder or grogged. A second mixture for addition to the first mixture is then prepared as follows:—One part of potatoes partly boiled is mixed with sulfuric acid to form a paste as before described to which five parts of red lead is added gradually with sufficient sulfuric acid to keep the mixture in paste form. This mixture is thoroughly dried and then reduced to powder and mixed with an equal weight of the powdered material produced from the first mixture sulfuric acid being added to form a paste. The paste so produced is then molded into plates which are thoroughly dried and afterward subjected to heat in the manner described in connection with the treatment of the first mixture, the plates being in this case wrapped in paper before being placed in the charcoal, which holds them separated and also excludes air. The plates so prepared are allowed to cool, then removed from the box, brushed free of charcoal and perforated to increase the active surface but without decreasing the strength. After fixing temporary electrical connections thereto the plates are short circuited between zinc or iron plates in acid, in which they should remain for twenty four hours or thereabout. At the end of this period the plates are removed, placed between positives charged at 1 amp. for ten hours and then discharged the charging and discharging of the plates being repeated until the acid remains quite clear and all impurities are extracted from the plates. Finally the temporary electrical connections are removed, the sides of the plates thoroughly cleansed and proper connections fitted. The plates are now ready for use as negatives. If positive plates are required the negative plates are taken when charged and are subjected to pressure, being afterward placed between negatives charged at ¼ amp. for plates about 4 inches square and discharged at about the same rate, the charging and discharging being repeated until the plates are fully formed.

In some cases the red lead referred to in the second mixture may be replaced by other lead compounds such as white lead, chlorid of lead and acetate of lead. Good results are also obtained by the use of litharge with sulfuric acid and potatoes as follows: Five parts of litharge, one part of potatoes and sufficient sulfuric acid of specific gravity 1200 to form a paste are mixed together and the paste is well ground in a mill with granite rollers, sulfuric acid being added at intervals if necessary to keep the paste sufficiently moist. The paste is then pressed in an iron mold and the pressed plate is then turned out and dried for about a day in the open. The dried paste is then placed in an air tight iron box subjected for four hours to a temperature rising up to about 1000° F. maintained for a further period of 4 hours at this temperature, then allowed to cool slowly. When sufficiently cool the baked paste is crushed and passed through a sieve having ⅛ inch holes. 40 parts of the granular mass so obtained is then well mixed with 60 parts of the original paste, and the paste so obtained is pressed into plates and then turned out and dried slowly at first but the longer it is allowed to dry the better, as if moisture is left in and heat is applied steam will be created which will cause the plate to crack, therefore great care should be exercised in determining when it is in a sufficiently dry state. Having made certain the plates are well dried they are put in an iron box and covered with a protective coating of thin paper, the box being made as air tight as possible. This is then subjected to a dull red heat for 6 or 8 hours when the heat can be increased up to about 1000° F. and it may be kept at this for about 2 hours. After burning the plates should be similar in appearance to a bath brick or burnt clay when taken from the furnace. The burnt plate having a lead contact attached can now be used as a negative plate in a cell with electrolyte of 1.200 specific gravity sulfuric acid, having two positive plates of zinc or iron. The new plate is suspended between the positive plate and is short circuited for 24 hours. After this it is put into another cell with positive electrodes and connected to a source of current at about 2 volts and about 2 amperes for a plate 4 inches square. The result of this action after about 10 hours will be to cause the electrolyte to become dirty. When this takes place the plate can be put into a fresh electrolyte. When the plate begins to show signs of giving off gas or bubbles it can be allowed to discharge at about 2 amperes. Each time it is charged and discharged the only effect excess of current will have is to cause the material to blister and disintegrate if the plate has not been properly burnt.

Although the treatment of the plate can be done in one electrolyte without harm it would be advisable to change the electrolyte until it remains clear, which may be after 3 or 4 changes as this provides evidence that the plate is completely purified. Another method for testing as to whether the plate is in a proper state is to take a sewing needle and press it into the active plate, if right, the needle can be forced right through without using much pressure. When the plate is in this spongy state it is capable of storing an extremely great amount of electrical energy.

Instead of molding the plates under pressure they may be formed by forcing the paste through dies to form a sheet and cutting the sheet into plates of the desired size or the paste may be pressed into a porous plate made of burnt clay, forming a grid or support.

The plates may be made of any desired dimensions and of any suitable form and may be corrugated or perforated in order to present a large electrolytic surface and to enable them to be charged and discharged at heavy rates. Furthermore, plates may be granulated and packed in a porous cell.

In another way of forming an active element, a ground grogged active plate is mixed with sufficient clay to bind and formed into a pot and baked and filled with granulated active plate forming a semi-active porous pot filled with active material.

In carrying out this process with litharge the litharge (PbO) with the sulfuric acid ($H_2SO_4$) gives lead sulfate ($PbSO_4$) with some excess of litharge. The potatoes have no apparent action at this stage but when the mixture is burnt the acid produces a deposit of carbon derived from the starch in the potatoes or other carbo-hydrates through the mass. This carbon reduces some lead sulfate ($PbSO_4$) to lead sulfid (PbS). When the first mixture mentioned is mixed with a portion of the same mixture which has been burnt, the result is that we have sulfate and sulfid, and when acid is added to the same a fresh deposit of carbon is formed owing to the acid acting upon the potatoes in that part of the first mixture which has not been burnt. After the above mixture has been burnt the carbon deposit reduces the sulfate to sulfid giving a porous structure, due to evolution of gas leaving only sulfate and sulfid, but with considerably more of sulfid than sulfate. The value of the potatoes seems to lie in the carbon that in that state can be distributed throughout the whole mixture in the finest possible particles—a result that it would be difficult to secure by chemical means. As the process proceeds the carbon that is distributed throughout the mass combines with the oxygen and is driven off in the second burning leaving the structure porous.

When red lead is employed as in the second mixture described above, the finished plate is of the same composition as when litharge is employed in both mixtures, viz., lead sulfate and lead sulfid, but the proportions might be changed to some extent.

During the process of manufacturing the plates they are covered with carbon to separate them and a portion of this carbon is probably absorbed in the course of manufacture, but the percentage would be very small. Sulfur in the sulfuric acid is extracted from the plate by the purifying process so that the finished plate consists of oxid of lead. If there are any other substances present they can only be present in a small and unappreciable degree.

We claim—

1. The method of forming active elements for electric accumulators which consists in mixing into a paste a lead compound, sulfuric acid and a substance rich in carbohydrates, then excluding the air and subjecting said mixture to a high temperature, allowing the mixture to cool, and finally purifying the same.

2. The process of manufacturing active elements for electric accumulators which consists in mixing a lead compound with a substance rich in carbohydrates and sulfuric acid to form a paste-like mass, molding the mass into plates, heating said plates in a receptacle from which air is excluded, grinding the burnt plates, and mixing the ground material with part of the original paste in a dried and finely powdered and unburnt condition, adding sulfuric acid to form a paste, molding into plates, and finally heating the plates in a closed receptacle.

3. The herein described process of manufacture of active elements for electric accumulators which consists in mixing potatoes and a lead compound with sulfuric acid to form a paste-like mass, molding the mass into plates, heating said plates in a receptacle from which air is excluded, grinding the burnt plates, and mixing the ground material with part of the original paste in a dried and finely powdered and unburnt condition, adding sulfuric acid to form a paste, molding into plates, and finally heating the plates in a closed receptacle.

4. The herein described process of manufacture of active elements for electric accumulators which consists in mixing potatoes and litharge with sulfuric acid to form a paste-like mass, molding the mass into plates, heating said plates in a receptacle from which air is excluded, grinding the burnt plates, and mixing the ground material with part of the original paste in a dried and finely powdered and unburnt condition, adding sulfuric acid to form a paste, molding into plates, and finally heating the plates in a closed receptacle, said plates being wrapped with paper and covered with carbon during the heating in the closed receptacle.

5. The herein described process of manufacture of active elements for electric accumulators which consists in mixing potatoes and a lead compound with sulfuric acid to form a paste-like mass, molding the mass into plates, heating said plates in a receptacle from which air is excluded, grinding the burnt plates, and mixing the ground material with part of the original paste in a dried and finely powdered and unburnt condition, adding sulfuric acid to form a paste, molding into plates, heating the plates in a closed receptacle, allowing the plates to cool and then short circuiting them between metal plates in acid, and finally placing said plates between positive electrodes in acid and alternately charging and discharging the plates until purified, substantially as described.

In testimony whereof we have affixed our signatures, in presence of two witnesses.

EMMANUEL HANCOCK.
DANIEL DAVID.

Witnesses:
  LORIN A. LATHROP,
  FLORENCE H. LITTLE.